US009332172B1

(12) United States Patent  (10) Patent No.: US 9,332,172 B1
Park et al.  (45) Date of Patent: May 3, 2016

(54) TERMINAL DEVICE, INFORMATION DISPLAY SYSTEM AND METHOD OF CONTROLLING THEREFOR

(71) Applicant: LG ELECTRONICS INC., Seoul (KR)

(72) Inventors: Sihwa Park, Seoul (KR); Sinae Chun, Seoul (KR); Doyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/604,306

(22) Filed: Jan. 23, 2015

(30) Foreign Application Priority Data

Dec. 8, 2014 (KR) ........................ 10-2014-0174695

(51) Int. Cl.
*H04N 5/232* (2006.01)
*H04N 1/32* (2006.01)

(52) U.S. Cl.
CPC ....... *H04N 5/23206* (2013.01); *H04N 1/32128* (2013.01); *H04N 5/23293* (2013.01)

(58) Field of Classification Search
None
See application file for complete search history.

(56) References Cited

U.S. PATENT DOCUMENTS

| 8,218,874 | B2* | 7/2012 | Boncyk | G06F 17/30247 |
| | | | | 382/181 |
| 8,413,188 | B2* | 4/2013 | Walter | G06F 17/30259 |
| | | | | 725/40 |
| 8,634,712 | B1* | 1/2014 | Mullins | H04N 21/6156 |
| | | | | 348/14.02 |
| 8,953,050 | B2* | 2/2015 | Huang | H04N 5/23206 |
| | | | | 348/207.1 |
| 2003/0044046 | A1* | 3/2003 | Nakamura | G08B 13/19608 |
| | | | | 382/103 |
| 2003/0097408 | A1* | 5/2003 | Kageyama | H04L 12/1818 |
| | | | | 709/205 |
| 2005/0085242 | A1* | 4/2005 | Nishizawa | G08G 1/123 |
| | | | | 455/456.1 |
| 2005/0086690 | A1* | 4/2005 | Gilfix | H04N 5/445 |
| | | | | 725/42 |
| 2005/0162523 | A1* | 7/2005 | Darrell | G06F 17/30864 |
| | | | | 348/211.2 |
| 2005/0185060 | A1* | 8/2005 | Neven | G06F 17/30244 |
| | | | | 348/211.2 |
| 2006/0190812 | A1* | 8/2006 | Ellenby | G06F 17/30259 |
| | | | | 715/209 |
| 2007/0279521 | A1* | 12/2007 | Cohen | G06K 9/00664 |
| | | | | 348/376 |
| 2007/0288453 | A1* | 12/2007 | Podilchuk | G06F 17/30259 |
| 2008/0268876 | A1* | 10/2008 | Gelfand | G06Q 30/02 |
| | | | | 455/457 |
| 2009/0207262 | A1* | 8/2009 | Kurosawa | H04N 5/4403 |
| | | | | 348/211.99 |
| 2010/0184451 | A1* | 7/2010 | Wang | G06F 17/30265 |
| | | | | 455/456.1 |
| 2010/0235391 | A1* | 9/2010 | Eklund, II | G06F 3/0481 |
| | | | | 707/780 |
| 2010/0279666 | A1* | 11/2010 | Small | H04M 1/576 |
| | | | | 455/414.1 |
| 2011/0016405 | A1* | 1/2011 | Grob | H04N 1/00127 |
| | | | | 715/740 |
| 2011/0138317 | A1* | 6/2011 | Kang | G06F 3/011 |
| | | | | 715/780 |
| 2011/0283334 | A1* | 11/2011 | Choi | G06F 3/04883 |
| | | | | 725/148 |
| 2012/0054691 | A1* | 3/2012 | Nurmi | G06Q 10/10 |
| | | | | 715/854 |
| 2012/0060109 | A1* | 3/2012 | Han | G06F 3/1454 |
| | | | | 715/769 |
| 2013/0040623 | A1* | 2/2013 | Chun | H04N 21/4126 |
| | | | | 455/414.2 |

(Continued)

FOREIGN PATENT DOCUMENTS

KR  10-2012-0067451 A  6/2012
KR  10-2014-0040486 A  4/2014

*Primary Examiner* — Michael Osinski
(74) *Attorney, Agent, or Firm* — Birch, Stewart, Kolasch & Birch, LLP

(57) ABSTRACT

A terminal device, an information display system and a method of controlling the terminal device are disclosed. The terminal device includes a camera unit configured to capture a picture in which an external device connected with a network is included, a control unit configured to detect the external device from the captured picture, a communication unit configured to transmit and receive data and a display unit configured to display the captured picture. If the detected external device in the captured picture is selected, the control unit controls the communication unit to receive information on the external device based on a sensing history of the external device and can control the display unit to display the received information on the external device on the display unit.

20 Claims, 12 Drawing Sheets

(56) References Cited

U.S. PATENT DOCUMENTS

| | | | |
|---|---|---|---|
| 2013/0120592 A1* | 5/2013 | Bednarczyk | H04N 5/765 348/207.1 |
| 2013/0169831 A1* | 7/2013 | Tomi | H04N 1/00278 348/207.2 |
| 2013/0290439 A1* | 10/2013 | Blom | G06Q 50/01 709/206 |
| 2014/0003656 A1* | 1/2014 | Lin | G06K 9/3241 382/103 |
| 2014/0019867 A1* | 1/2014 | Lehtiniemi | G06Q 50/01 715/738 |
| 2014/0068514 A1* | 3/2014 | Ito | H04N 5/23293 715/810 |
| 2014/0075348 A1* | 3/2014 | Sathish | G06F 3/0481 715/764 |
| 2014/0184830 A1* | 7/2014 | Eom | H04W 12/04 348/207.11 |
| 2014/0244836 A1 | 8/2014 | Goel et al. | |
| 2014/0323120 A1 | 10/2014 | Kim et al. | |
| 2015/0016675 A1* | 1/2015 | Kishi | G06Q 30/00 382/103 |
| 2015/0113564 A1* | 4/2015 | Mushikabe | H04N 21/4126 725/37 |
| 2015/0124099 A1* | 5/2015 | Evanitsky | G06K 9/00785 348/149 |
| 2015/0146040 A1* | 5/2015 | Nonaka | G06K 9/00671 348/231.4 |
| 2015/0154840 A1* | 6/2015 | Black | G08B 13/19684 348/143 |

* cited by examiner

| Time | Program |
|---|---|
| 09:00 ~ 10:00 | aaa |
| 10:10 ~ 11:50 | bbb |
| 13:20 ~ 15:40 | ccc |
| 17:00 ~ 18:00 | ddd |
| 18:00 ~ 19:00 | eee |

FIG. 6

| Date | Time | Number |
|---|---|---|
| 10. 26 | 07:00 | 2 times |
| 10. 26 | 11:40 | 1 time |
| 10. 26 | 11:47 | 3 times |
| 10. 26 | 18:13 | 2 times |
| 10. 27 | 07:04 | 2 times |
| 10. 27 | 11:43 | 4 times |

(a)

(b)

(c)

(a)

(b)

(c)

TERMINAL DEVICE, INFORMATION DISPLAY SYSTEM AND METHOD OF CONTROLLING THEREFOR

This application claims the benefit of the Korean Patent Application No. 10-2014-0174695, filed on Dec. 8, 2014, which is hereby incorporated by reference as if fully set forth herein.

BACKGROUND OF THE INVENTION

1. Field of the Invention

The present specification relates to a terminal device, an information display system and a method of controlling the terminal device.

2. Discussion of the Related Art

Various electronic devices are developing in accordance with advancement of an electronic technology. As electronic devices are miniaturized and are equipped with a high-end technology, various functions can be performed by the electronic devices. For instance, in case that a user is going out to capture a picture, the user used to bring a cellular phone, a camera and a location display device to capture a picture. Yet, since a smartphone, which is used these days, is able to perform all functions such as a communication function, a camera function and a location display function, a single smartphone can satisfy all of the aforementioned functions required by a user.

Meanwhile, a study on a technology used for connecting all objects with each other using a network is recently attempted. The technology, which is called IoT (internet of Things), indicates a technology used for communicating information between a human and an object and information between objects in a manner of connecting all objects with each other based on the internet.

The IoT technology can provide various services in an electronic device capable of performing various functions. Hence, it is necessary for an electronic device to be equipped with various and helpful user interfaces (UIs) or user experiences (UXs) based on the IoT technology.

SUMMARY OF THE INVENTION

Accordingly, the present specification is directed to an apparatus and method thereof that substantially obviate one or more problems due to limitations and disadvantages of the related art. An object of the present specification is to provide a terminal device capable of checking data of an external device, which is captured as an object in a picture, and using the data, an information display system and a method of controlling the terminal device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a terminal device includes a camera unit configured to capture a picture in which an external device connected with a network is included, a control unit configured to detect the external device from the captured picture, a communication unit configured to transmit and receive data and a display unit configured to display the captured picture. If the detected external device in the captured picture is selected, the control unit controls the communication unit to receive information on the external device based on a sensing history of the external device and can control the display unit to display the received information on the external device on the display unit.

The control unit can control the communication unit to receive tagging information from the external device situating within a predetermined distance and detect the external device based on the received tagging information.

Meanwhile, the tagging information can include at least one selected from the group consisting of unique information, identification information, location information, authority information and owner information of the external device.

If the detected external device in the captured picture is selected, the control unit can control the communication unit to receive the information on the external device of a timing on which the picture is captured.

And, the control unit can control the communication unit to further receive at least one of previous information of the timing on which the picture is captured and later information of the timing on which the picture is captured.

And, the control unit can control the display unit to display an indicator selecting the previous information or the later information of the displayed information.

Meanwhile, the information on the external device can include at least one selected from the group consisting of use information, moving path information, location information, content information and list information of the external device.

If the external device corresponds to a vehicle, the control unit can control the display unit to display the location information of a timing on which the picture is captured.

And, the control unit can control the display unit to display the moving path information of the vehicle on a map.

If the external device corresponds to a content player, the control unit can control the display unit to display the content information of a timing on which the picture is captured.

And, the control unit can control the communication unit to receive list information of content played by the content player. If one content is selected from the list information of the received contents, the control unit can play the selected content.

And, the control unit can control the communication unit to receive list information of content played by the content player and if one content is selected from the list information of the received contents, the control unit can control the communication unit to transmit a playback command of the selected content to the content player.

Meanwhile, the content may correspond to at least one selected from the group consisting of a sound source, a video and a game.

Meanwhile, if the external device corresponds to a smart picture frame, the control unit can control the display unit to display information on an image displayed on the smart picture frame of a timing on which the picture is captured.

And, the control unit controls the communication unit to receive list information of the image displayed on the smart picture frame and if one image is selected from the received list information of the image, the control unit can control the display unit to display the selected image in a manner of composing with the captured picture.

And, the control unit determines an owner of the external device based on the owner information of the external device and if the external device is owned by a different person, the control unit can make a request for data of the external device to the owner of the external device.

To further achieve these objects and other advantages and in accordance with the purpose of the invention, as embodied and broadly described herein, according to one embodiment, an information display system includes a terminal device configured to capture a picture in which an external device connected with a network is included, the terminal device configured to detect the external device from the captured picture, the terminal device configured to display the captured picture, the terminal device, if the detected external device in the captured picture is selected, configured to request information on the external device based on a sensing history of the external device and an external device configured to transmit the information on the external device to the terminal device according to the request of the terminal device. The terminal device can receive and display the information on the external device To further achieve these objects and other advantages and in accordance with the purpose of the invention, as embodied and broadly described herein, according to one embodiment, a method of controlling a terminal device includes the steps of capturing a picture in which an external device connected with a network is included, detecting the external device from the captured picture, if the detected external device in the captured picture is selected, receiving information on the external device based on a sensing history of the external device and displaying the received information on the external device.

And, the step of receiving the information on the external device can receive the information on the external device of a timing on which the picture is captured.

And, the step of receiving the information on the external device can further receive at least one of previous information of the timing on which the picture is captured and later information of the timing on which the picture is captured.

According to the aforementioned various embodiments, a terminal device, an information display system and a method of controlling the terminal device can check data of an external device captured in a picture and use the data.

A terminal device, an information display system and a method of controlling the terminal device can check history information of a captured external device.

A terminal device, an information display system and a method of controlling the terminal device can select and play one content included in content information using the content information used to be played by a captured external device.

A terminal device, an information display system and a method of controlling the terminal device can change a partial area of an image in which an external device is included using content information of the captured external device.

Moreover, if a captured external device corresponds to a device owned by a different person, a terminal device, an information display system and a method of controlling the terminal device can make a request to the owner of the external device for access permit for information of the external device.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram for explaining a different embodiment of history information of an external device;

DETAILED DESCRIPTION OF THE INVENTION

Figure 1:
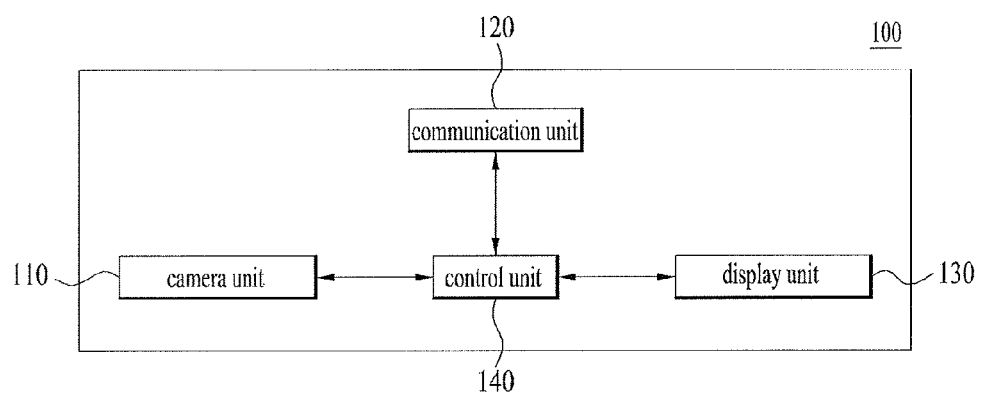
FIG. 1 is a block diagram for a terminal device according to one embodiment.

In the following description, preferred embodiments capable of concretely implementing the aforementioned object are explained with reference to attached drawings. In this case, composition and effect of the present specification shown in the drawings and explained by the preferred embodiments are explained as at least one embodiment. A technical idea of the present specification, a core composition and effect may be non-limited by the embodiment.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

FIG. 1 is a block diagram for a terminal device according to one embodiment.

Referring to FIG. 1, a terminal device 100 can include a camera unit 110, a communication unit 120, a display unit 130 and a control unit 140.

The camera unit 110 can capture a picture including an external device connected with a network. As an embodiment, the external device connected with the network may correspond to an IoT (Internet of Things) device. The external device can include a sensor module and a communication module. The external device can detect information using the sensor module. The external device can further include a storing module. Hence, the external device can store detected information in the storing module and can store basic information of the external device and the like. For instance, the basic information of the external device can include use information, moving path information, location information, content conformation, list information and the like. The information detected by the external device can include use information, moving path information, location information, content information, list information and the like. The basic information of the external device and the detected information may include a plurality of information. The external device can transceive various information with a server, a different external device or a terminal device. There may exist a plurality of external devices. The camera unit 110 can capture the external device.

The control unit 140 can detect the external device included in a captured picture. As one embodiment, the control unit 140 recognizes the external device using an image processing scheme and may be then able to detect the external device. The control unit 140 can detect a contour, color and the like of the external device corresponding to an object in a picture. The control unit 140 can recognize a type and the like of the external device based on detected information. The control unit 140 can make a request for tagging information of the external device located at a near position based on the recognized information and may be then able to receive the tagging information. The control unit 140 can detect the external device in the picture based on the received tagging information of the external device.

Or, the control unit 140 can transmit such information as contour, color and the like of the detected external device and location information of the terminal device 100 to a server. The server receives tagging information of the terminal device 100, tagging information of the external device and the like and can store the tagging information in the server. The server can search for tagging information of a corresponding external device based on the information such as the contour, the color and the like of the external device received from the terminal device 100 and the location information. The server is closest from a position of the terminal device 100 and can transmit the tagging information on the external device matched with the information such as the received contour, the color and the like to the terminal device 100. The control unit 140 can detect the external device in a picture based on the received tagging information of the external device.

The tagging information of the external device may correspond to information used for distinguishing the external device form a different device or information associated with the external device. For instance, the tagging information can include unique information, identification information, location information, authority information, owner information and the like of the external device. The tagging information can include a plurality of information.

The communication unit 120 can transmit and receive data. As mentioned in the foregoing description, the communication unit 120 is able to transceive data with an external device or a server. The display unit 130 can display a captured picture according to a user command. The display unit 130 can receive a touch input of a user in a manner of being implemented with a touch sensor.

When a detected external device is selected in a captured picture, the control unit 140 can control the communication unit 120 to receive information of the external device based on a sensing history of the external device. The control unit 140 can recognize a touch command of a user inputted on the external device in the captured picture as a command selecting the external device. If the external device is selected, the control unit 140 makes a request for information to the selected external device. As one embodiment, the information of the external device requested by the control unit 140 may correspond to use information, moving path information, location information, content information, list information and the like of the external device. Whenever the external device performs an operation, the external device can store information associated with the performed operation or can transmit the information to a server. For instance, if the external device corresponds to a seasoning container, the seasoning container detects such information as a type of seasoning contained in the container, time of use of the seasoning container, number of use of the seasoning container, an amount of seasoning actually used and the like and stores the information. Or, the seasoning container can transmit the information to a server. If the external device corresponds to a TV, the TV can detect such information as turn-on time, turn-off time, information on a displayed content, information on a displayed broadcast and the like and store the information. Or, the TV can transmit the information to a server. If the external device corresponds to a vehicle, the vehicle detects such information as driving start time, driving end time, driving distance, a location of the vehicle, an amount of gas being used and the like and stored the information. Or, the vehicle can transmit the information to a server.

Meanwhile, information on an operation performed by the external device may include information detected by the external device. And, the information on the operation performed by the external device may have a list form or may correspond to a history of detected information. The external device can transmit the information on the operation performed by the external device to a terminal device 100. The external device can transmit a plurality of information possessed by the external device to the terminal device at a time when an information request is received from the terminal device 100. Or, the external device can transmit information requested by the terminal device 100 only to the terminal device. For instance, if the external device includes a plurality of information detected on 13:10, 14:20 and 15:30, respectively, the external device can transmit all of a plurality of the information detected on 13:10, 14:20 and 15:30, respectively, to the terminal device 100 at a time. Or, if information detected on 13:10 is requested, the external device can transmit the information detected on 13:10 only to the terminal device. Similarly, if information detected on 14:20 is requested, the external device can transmit the information detected on 14:20 only to the terminal device.

The control unit 140 can control the display unit to display received information of the external device on a display.

Meanwhile, a process of capturing a picture including an external device and a captured picture displaying process can be performed by terminal devices different from each other. For instance, a first terminal device can capture a picture including an external device. The first terminal device can transmit the captured picture to a server or a second terminal device. The second terminal device receives the captured picture from the first terminal device or the server and may be then able to display the captured picture. In this case, the first terminal device can capture a picture including an external device connected with a network via the camera unit. The control unit of the first terminal device can detect the external device from the captured picture. The communication unit of the first terminal device can transmit and receive necessary information. The first terminal device can receive necessary information from the external device or the server. A process of capturing a picture captured by the first terminal device or a process of detecting the external device detected by the first terminal device may be identical to the aforementioned process.

The second terminal device receives the captured picture and may be then able to display the captured picture. If the detected external device is selected in the captured picture, the communication unit of the second terminal device can receive information of the external device based on a sensing history of the external device. The display unit of the second terminal device can display the received information of the external device. The control unit of the second terminal device can control the communication unit and the display unit to receive and display the information of the external device.

Figure 2:
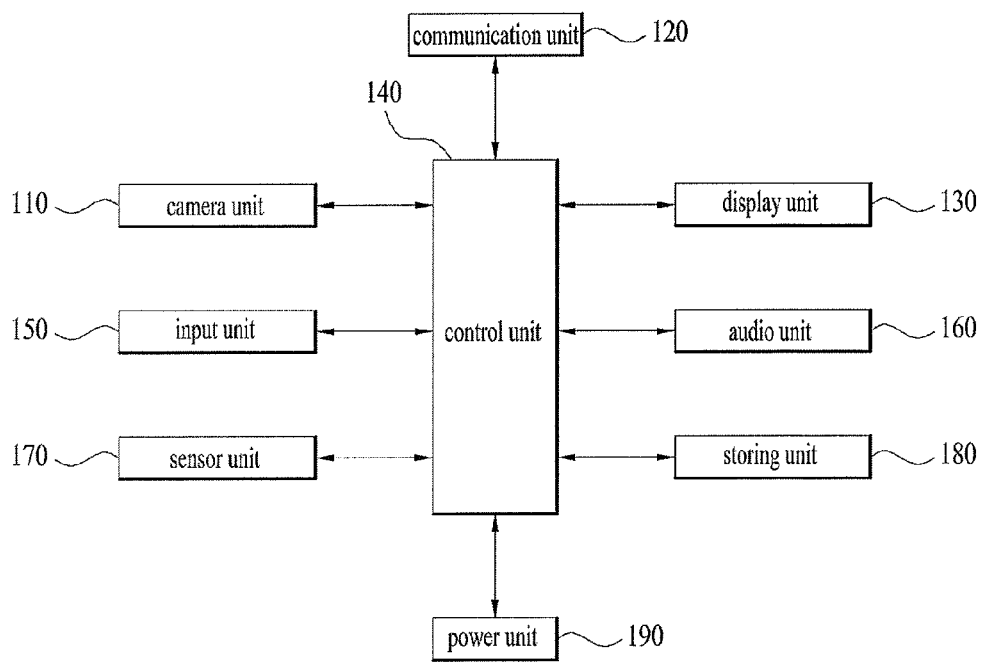
FIG. 2 is a block diagram for a terminal device according to a different embodiment.

FIG. 2 is a block diagram for a terminal device according to a different embodiment.

Referring to FIG. 2, a terminal device can include a camera unit 110, a communication unit 120, a display unit 130, a control unit 140, an input unit 150, an audio unit 160, a sensor unit 170, a storing unit 18 and a power unit 190.

The camera unit 110 can capture an external device connected with a network. The camera unit 110 captures an image of environment surrounding the terminal device and converts the image into an electrical signal. To this end, the camera unit 110 can include an image sensor capable of converting an optical signal into an electrical signal. The image captured by the camera unit 110 and converted into the electrical signal is stored in the storing unit 180. And then, the image can be outputted by the control unit 140. Or, the image can be outputted by the control unit 140 without being stored in the storing unit. And, the image captured by the camera unit 110 may correspond to a still image or a moving image. The camera unit 110 can be used as a motion sensor or a video sensor. The camera unit 100 may include a plurality of cameras if necessary.

The communication unit 120 performs communication with an external device or a server using various protocols and may be then able to transceive data with the external device or the server. The external device may correspond to a mobile terminal or a fixed terminal. For instance, a mobile terminal may correspond to a cellular phone, a smartphone, a tablet PC (personal computer), a smart pad, a notebook, a digital broadcast terminal, a PDA (personal digital assistant), a PMP (portable multimedia player), a digital camera, a navigation, a radio or the like. A fixed terminal may correspond to a desktop, a DVD (digital video disc or digital versatile disc) player, a TV, a record player, a jukebox or the like. And, the external device can include not only a general electronic device but also an IoT device. The IoT device may correspond to all objects including a sensor module and a communication module. In particular, all objects capable of detecting information using the sensor module and transmitting information using the communication module may correspond to the IoT device. For instance, if a thing includes the sensor module and the communication module, a seasoning container of a restaurant, a cutting board, a plate, a frying pan, a cup, a vehicle, a flower vase, an umbrella, a frame, cosmetics, a pencil case, a personal organizer, a bottle and the like may become the IoT device. It is apparent that the aforementioned mobile terminal and the fixed terminal also become the IoT device.

Various protocols include a wired and a wireless communication protocols. In case of the wired protocol, the communication unit 120 can include various input output interfaces (not depicted) enabling wired data transmission communication with an external device to be performed. For instance, the interfaces include USB (universal serial bus), HDMI (high definition multimedia interface), DVI (digital visual interface), IEEE 1394, and an interface in consideration of data transmission according to a different similar specification associated with the data transmission. In case of the wireless communication, the communication unit 120 can include such an RF electronic circuit network in consideration of a radio access accessing an external communication network as the Internet, LAN (local area network), WAN (wide area network) and the like. A wireless communication network accessed by the communication unit 120 can support such a mobile communication scheme as GSM (global system for mobile communications), EDGE (enhanced data GSM environment), CDMA (code division multiple access), W-CDMA (wideband code division multiple access), TDMA (time division multiple access), Wibro, HSPA (high speed packet access), HSDPA (high speed downlink packet access), LTE (long term evolution) and the like and such a local area communication scheme as Bluetooth, RFID (radio frequency identification), IrDA (infrared data association), UWB (ultra wideband), ZigBee, WLAN (wireless LAN) (Wi-Fi) and the like.

In this case, the wired/wireless interface schemes correspond to embodiments to help understand the present specification. Since an interface scheme used for transmitting and receiving information can be easily changed by those skilled in the art, the interface scheme may be non-limited by the aforementioned embodiments.

The display unit 130 can output an image on a display screen. The display unit 130 can output an image based on content executed by the control unit 140 or a control command. In the present specification, the display unit 130 can output a captured picture including an external device. Meanwhile, the display unit 130 can be implemented by such a form as a display unit of a head mounted display or a beam projector.

The control unit 140 can execute content stored in the storing unit 180, content received for data communication and the like. And, the control unit 140 executes various applications and can process an internal data of a terminal device. And, the control unit 140 controls each of components of the aforementioned terminal device and may be able to control data transmission and reception between the components of the terminal device. The control unit 140 can include a processor known to a related technical field, an ASIC (application-specific integrated circuit), a different chipset, a logical circuit, a register, a communication modem, a data processing device and the like to execute various control logic to be explained in detail in the following description. And, in case that the aforementioned control logic is implemented by software, the control unit 140 can be implemented by a set of program modules. In this case, the program modules are stored in the storing unit 180 and can be executed by the processor.

The input unit 150 can receive an input of a user command from external. The input unit 150 can be implemented in various ways. For instance, the input unit 150 can be implemented by a keyboard, a keypad, a mouse, a touch pad, a button, a soft key or the like. In a broad sense, the input unit 150 can include a microphone, a touch screen and the like. The microphone can receive voice of a user and the touch screen can receive an input of a touch gesture of a user. In some cases, the microphone can be included in the audio unit 160 and the touch screen can be included in the display unit 130.

The audio unit 160 can include an audio output means such as a speaker and the like and an audio input means such as a microphone and the like. The audio output means can output an audio signal of content executed in a terminal device. Content can be provided by the storing unit 180 or can be provided by an external device via the communication unit 120. The audio input means can include at least one of an air conduction speaker and a bone conduction speaker. The air conduction speaker may include earphone and the like. The air conduction speaker vibrates air according to an audio signal and generates a sound wave. In particular, vibration of sound conducted by air is delivered to eardrum situating at the inside of an ear and vibration of the eardrum is delivered to a snail of a screw shape via three bones positioned at the inside of the eardrum. Such liquid as lymph fluid is filled with the snail. Vibration of the liquid is converted into an electrical signal and the electrical signal is delivered to auditory nerve. In doing so, a brain of a human recognizes a sound. The bone conduction speaker can be arranged at various positions capable of smoothly providing an audio signal converted into vibration of frequency form to a user. In case of using the bone conduction speaker, vibration of a frequency form is delivered to the internal ear of a user by driving the bone conduction speaker in a manner that a bone conduction sound wave is conducted to a scull of a user. When the bone conduction speaker is used, a user is able to listen to an audio signal without jarring the eardrum. Meanwhile, the audio unit 160 can be used as an audio sensor as well.

The sensor unit 170 detects surrounding environment of a terminal device using at least one or more sensors installed in the terminal device and can deliver it to the control unit 140. The sensor unit 170 detects a user input and can deliver it to the control unit 140. In this case, the sensor unit 170 can include at least one or more sensing means. For instance, the sensing means can include such various sensing means as a gravity sensor, a terrestrial magnetism sensor, a motion sensor, a gyro sensor, an acceleration sensor, an infrared sensor, an inclination sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a fingerprint sensor and the like. The sensor unit 170 is a common name of the aforementioned various sensing means. The sensor unit senses various inputs of a user and user environment and can deliver a sensed result to the control unit 140 to make the control unit 140 perform an operation according to the sensed result. The aforementioned sensing means can be included in a terminal device as a separate element. Or, the sensing means can be included in the terminal device in a manner of being integrated into at least one or more elements.

Meanwhile, the sensor unit 170 can be mounted on the display unit 130 of the terminal device. Hence, the terminal device can detect various user inputs performed on the display unit 130 via the sensor unit 170. For instance, if the sensor unit 170 includes a touch sensor, the terminal device can receive various touch inputs performed on the display unit 130. And, if the sensor unit 170 includes a fingerprint sensor, the terminal device can collect fingerprint information of a user from a user input performed on the display unit 130. As mentioned in the foregoing description, the terminal device can include a screen sensor forming a layer structure formed by the display unit 130 and the sensor unit 170.

The storing unit 180 can store such various digital data as a video, an audio, a picture, an application and the like. The application may correspond to a program used for an operation of the control unit 140. And, the video or the picture may correspond to data obtained by the camera unit 110. The storing unit 180 can be implemented by such a form as a RAM (random access memory), an SRAM (static random access memory), a ROM (read only memory), an EEPROM (electrically erasable programmable read only memory), a PROM (programmable read only memory) and the like. And, the storing unit 180 may perform a storing function in a manner of operating in relation to a web storage on the Internet. The storing unit 180 can further include an external storing medium capable of being attached and detached to/from the terminal device. The external storing medium can be implemented by a slot form such as an SD (secure digital) memory or a CF (compact flash) memory, a memory stick form, a USB (universal serial bus) form or the like. In particular, the external storing medium can be attachable and detachable to/from the terminal device and may be able to provide such content as an audio, a picture, a video, an application and the like to the terminal device. For instance, the storing unit 180 can include a RAM, a ROM, a cache memory, a hard disk drive (HDD), a solid state drive (SSD), a CD, a DVD, a blue ray disk, a floppy disk (FDD), a magnetic disk, a memory card, a flash memory, a USB memory and the like.

The power unit 190 is a power source connected with a battery or an external power source. The power unit can supply power to a terminal device. The battery includes not only a primary battery but also a secondary battery. The secondary battery can include a rechargeable lithium ion battery, a lithium polymer battery, a nickel cadmium battery, a nickel hydride battery, a nickel zinc battery and the like.

Meanwhile, a terminal device may indicate a device of various forms capable of processing digital data and performing an operation corresponding to the digital data. As performance of the terminal device is enhancing, it is able to execute various contents via the terminal device. For instance, the terminal device can include a TV, a laptop computer, a desktop computer, a monitor, a smartphone, a tablet PC, a navigator, a PMP, a terminal for payment, a terminal for security, a kiosk and the like. In particular, a widely used portable device is recently utilized as a player of comprehensive multimedia contents.

So far, a block diagram for a terminal device has been explained. In the following description, an information display system and a concrete embodiment are explained.

Figure 3:
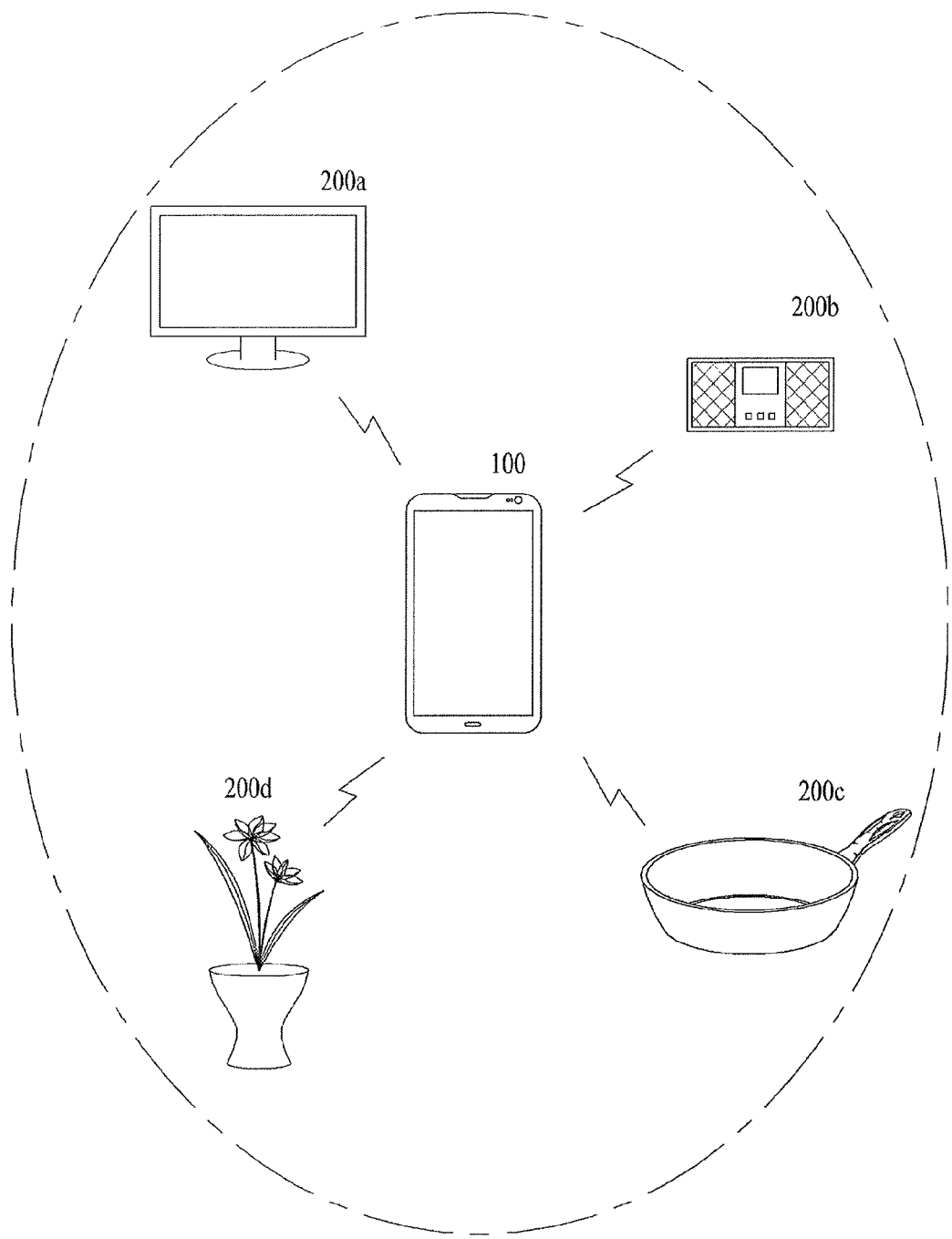
FIG. 3 is a diagram for explaining an information display system according to one embodiment.

FIG. 3 is a diagram for explaining an information display system according to one embodiment.

Referring to FIG. 3, an information display system can include a terminal device 100 and external devices 200a/200b/200c/200d. There may exist a single external device or a plurality of external devices. The external device can exchange information with the terminal device in a manner of being connected with a network.

First of all, each of the external devices 200 can include a sensor module and a communication module. The external device 200 can detect information using the sensor module. For instance, a TV can detect such information as turn-on time or turn-off time, channel information, information on content which has provided a service, TV watching time and the like. A frying pan can detect such information as use time, heating temperature and the like. A flower vase can detect such information as temperature, humidity and the like. The external device 200 can generate an information group by tagging unique information with detected information. In particular, the external device 200 can generate the detected information as tagging information together with unique information, identification information, authority information, owner information, location information and the like. A type of the detected information may vary according to the external device 200. The external device 200 may store the detected information in a manner of further including a storing module.

The terminal device 100 can capture a picture of an external device as an object. The terminal device 100 can detect the external device 200 included in the captured picture. As one embodiment, the terminal device 100 can recognize a contour, color and the like of the external device included in the captured picture. The terminal device 100 can detect a type of device of the external device included in the captured picture in a manner of communicating with a surrounding external device. For instance, the terminal device 100 transmits exterior information of the external device included in the captured picture to the surrounding external device 200 and may be able to ask whether to match with the external device. If the exterior information received from the terminal device 100 is matched with information of the external device, the external device 200 can transmit a response signal to the terminal device 100 to indicate that the exterior information is matched with the information of the external device. The terminal device 100 can recognize a type of device of the external device included in the picture using the response signal received from the external device 200. The external device 200 may transmit not only the response signal but also tagging information of the external device to the terminal device 100.

As a different example, the terminal device 100 may make a request for tagging information to a surrounding external device 200. The external device 200 can transmit the tagging information to the terminal device according to the request of the terminal device 100. The terminal device 100 compares the received tagging information with the exterior information of the external device and may be then able to check whether the tagging information is matched with the exterior information of the external device. The terminal device 100 can detect the external device in the picture based on the tagging information of the matched external device. If the external device is recognized in the picture, the terminal device 100 can store the picture in a manner of tagging information of the recognized external device on the picture. The terminal device 100 can perform communication with an external device 200 positioned within a prescribed distance. A distance to the external device 200 can be recognized based on location information of the external device 200, signal strength received from the external device 200 or the like. Yet, the prescribed distance may correspond to a concept of a randomly configured sketchy distance rather than a concept of a generally recognized clear distance.

The terminal device 100 can display a picture in which an external device is included. In some cases, the picture in which the external device is included can be transmitted to a different terminal device. In particular, the terminal device 100, which has captured the picture in which the external device is included, and a terminal device 100 displaying the picture may be identical to each other or may be different from each other.

When the terminal device 100 displays the picture including the external device, the terminal device can receive an input of a command selecting the external device from a user. The command selecting the external device can be inputted on a touch screen via a touch gesture or can be inputted via such an input means as a mouse. In some cases, the terminal device 100 can select the external device in the picture by receiving a user gaze via such an input means as a camera or receiving audio via such an input means as a microphone.

If the external device in the picture is selected, the terminal device 100 can make a request for sensing information to the selected external device 200. The selected external device 200 can transmit the sensing information to the terminal device 100. The selected external device 200 can transmit the sensing information based on a sensing history. In particular, the selected external device 200 can transmit sensing information of a timing on which the picture is taken, sensing information before the timing on which the picture is taken, sensing information after the timing on which the picture is taken and the like together. Or, the selected external device 200 may transmit requested sensing information only among the sensing information of the timing on which the picture is taken, the sensing information before the timing on which the picture is taken and the sensing information after the timing on which the picture is taken.

The terminal device 100 can display the sensing information received from the external device. Meanwhile, the external device 200 transmits the sensing information to a server and the terminal device 100 may receive necessary sensing information from the server in a manner of connecting with the server.

Figures 4, 5:
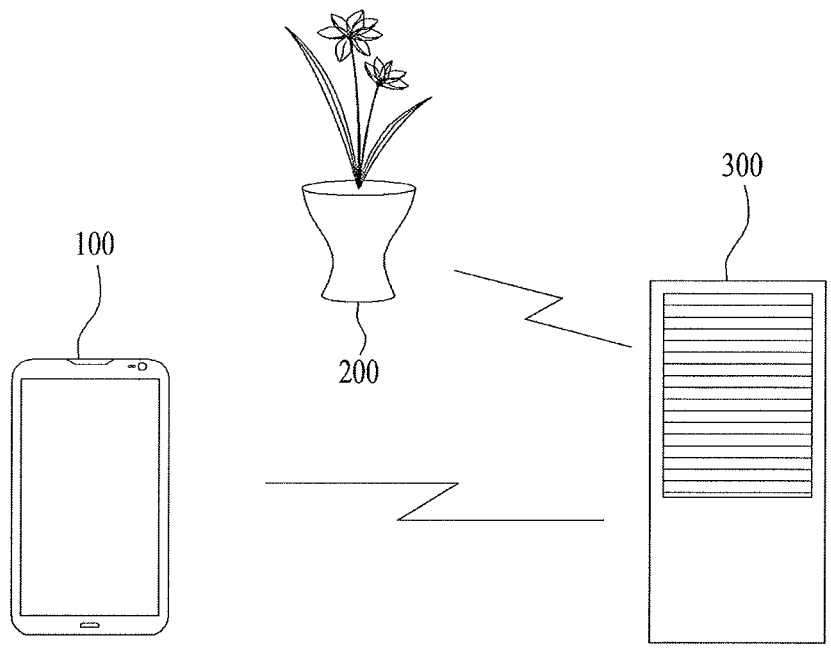
FIG. 4 is a diagram for explaining an information display system according to a different embodiment.
FIG. 5 is a diagram for explaining one embodiment of history information of an external device.

FIG. 4 is a diagram for explaining an information display system according to a different embodiment.

Referring to FIG. 4, an information display system can include a terminal device 100, an external device 200 and a server 300. Although there exists a single external device in FIG. 4, there may exist one or more external devices 200. The server 300 can exchange data with the terminal device 100 and the external device 200 in a manner of being connected with a network.

As mentioned earlier in FIG. 3, the external device can detect information using a sensor module. The external device 200 can transmit the detected information to the server using a communication module. The server 300 can store the information received from the external device 200. When the server 300 receives information from the external device 200, the server can determine whether the external device 200 corresponds to an external device, which has previously transmitted information. If the external device corresponds to the external device 200, which has previously transmitted information, the server can store the received information in addition to previous information. Hence, the server 300 can generate history information associated with a single external device 200.

The terminal device 100 can capture a picture of an external device as an object. The terminal device 100 is able to detect an external device 200 included in the captured picture. As one embodiment, the terminal device 100 can recognize a contour, color and the like of the external device included in the captured picture. The terminal device 100 can transmit exterior information of the recognized external device to the server 300. The server 300 can search for stored information of the external device matched with the exterior information of the external device received from the terminal device 100. The server 300 can transmit the matched information of the external device to the terminal device 100. The terminal device 100 can detect the captured external device based on the information of the external device received from the server 300.

Or, the terminal device 100 can make a request for information on a surrounding external device to the server 300. The server 300 can transmit the information on the external device 200 in the vicinity of the terminal device 100 according to the request of the terminal device 100. The server 300 can transmit all information of the external device 200 or transmit information necessary for identifying the external device 200 only. For instance, the information necessary for identifying the external device 200 may correspond to at least one selected from the group consisting of unique information, identification information, location information, color information, type information and shape information. The unique information or the identification information may correspond to unique information of each external device 200 or information capable of distinguishing an external device from a different external device. The type information may correspond to information on a type of an external device.

The terminal device 100 can search for information matched with information of a recognized external device among the information received from the external device. The terminal device 100 can detect the external device 200 from the searched information. Meanwhile, the terminal device 10 can transmit information of the terminal device to the server 300. The server 300 can store the information of the terminal device 100 received from the terminal device.

The terminal device 100 can display a picture in which an external device is included. In some cases, the picture in which the external device is included can be transmitted to a different external device. In particular, the terminal device 100, which has captured the picture including the external device, and the terminal device 100 displaying the picture may be identical to each other or may be different from each other.

In FIG. 4, information exchange between the terminal device 100 and the external device 200 can be performed via such a medium as the server 300. An operation of the terminal device 100 or an operation of the external device 200 may be identical to the operation mentioned earlier in FIG. 3 except a point that the information exchange is performed via the server 300.

FIG. 5 is a diagram for explaining one embodiment of history information of an external device.

Referring to FIG. 5, it shows history information including time and program information. An external device may have information of an identical property irrespective of a type of the external device. For instance, unique information, identification information, location information, type information, shape information, operation information, use information and the like may correspond information possessed by all external devices. And, an external device may have individual information according to a type of the external device. For instance, such an external device as a seasoning container may further include ingredient information. Such an external device as a content player may further include program information. Examples of the content player may include a radio, a TV, a DVD player, a CD player, a smartphone, a tablet PC, an electronic frame and the like.

FIG. 5 shows an embodiment of use information capable of being owned by the content player. The content player can play a specific content according to a command of a user. The content player can detect information on content playing time and a content type. The detected information can be stored in the content player or can be transmitted to a server. As one embodiment, in case that the content player plays such a program as 'aaa' from 9 to 10 o'clock, the content player can generate and store information such as 'aaa program playback from 9 to 10 o'clock' or transmit the information to a server. Subsequently, the content player can play such a program as 'bbb' from 10:10 to 11:50. The content player can generate and store information such as 'bbb program playback from 10:10 to 11:50' or transmit the information to a server. The content player can add current information to previous information. If a plurality of time information and program information are accumulated, a plurality of the time information and the program information may become a use information history of the content player.

FIG. 6 is a diagram for explaining a different embodiment of history information of an external device.

Referring to FIG. 6, it shows history information including date information, time information and number information. FIG. 6 may correspond to one embodiment of use information of such an external device as a seasoning container.

Such an external device as a seasoning container may include a sensor module and a communication module. The sensor module can detect an operation, time, a location and the like of the seasoning container. For instance, the seasoning container can detect use time and number information on a timing that the seasoning container is used. If the seasoning container is used twice on October $26^{th}$ 7 A.M., the seasoning container detects and stores such information as 'date: October $26^{th}$, time: 7 A.M., number of use: 2' or may transmit the information to a server. Subsequently, if the seasoning container is used once on October $26^{th}$ 11:40 A.M., the seasoning container detects and stores such information as 'date: October $26^{th}$, time: 11:40 A.M., number of use: 1' or may transmit the information to a server. If detected use information are accumulated, it may become a use information history of the seasoning container.

As mentioned in the foregoing description, an external device can store detected information or transmit the information to a server. A terminal device can capture a picture in which the external device is included. The terminal device detects the external device in the picture and may be able to make a request for information of the detected external device. Having received the requested information of the external device, the terminal device can display information associated with the external device according to an external device selection command.

In the following, embodiments are explained in detail.

Figure 7:
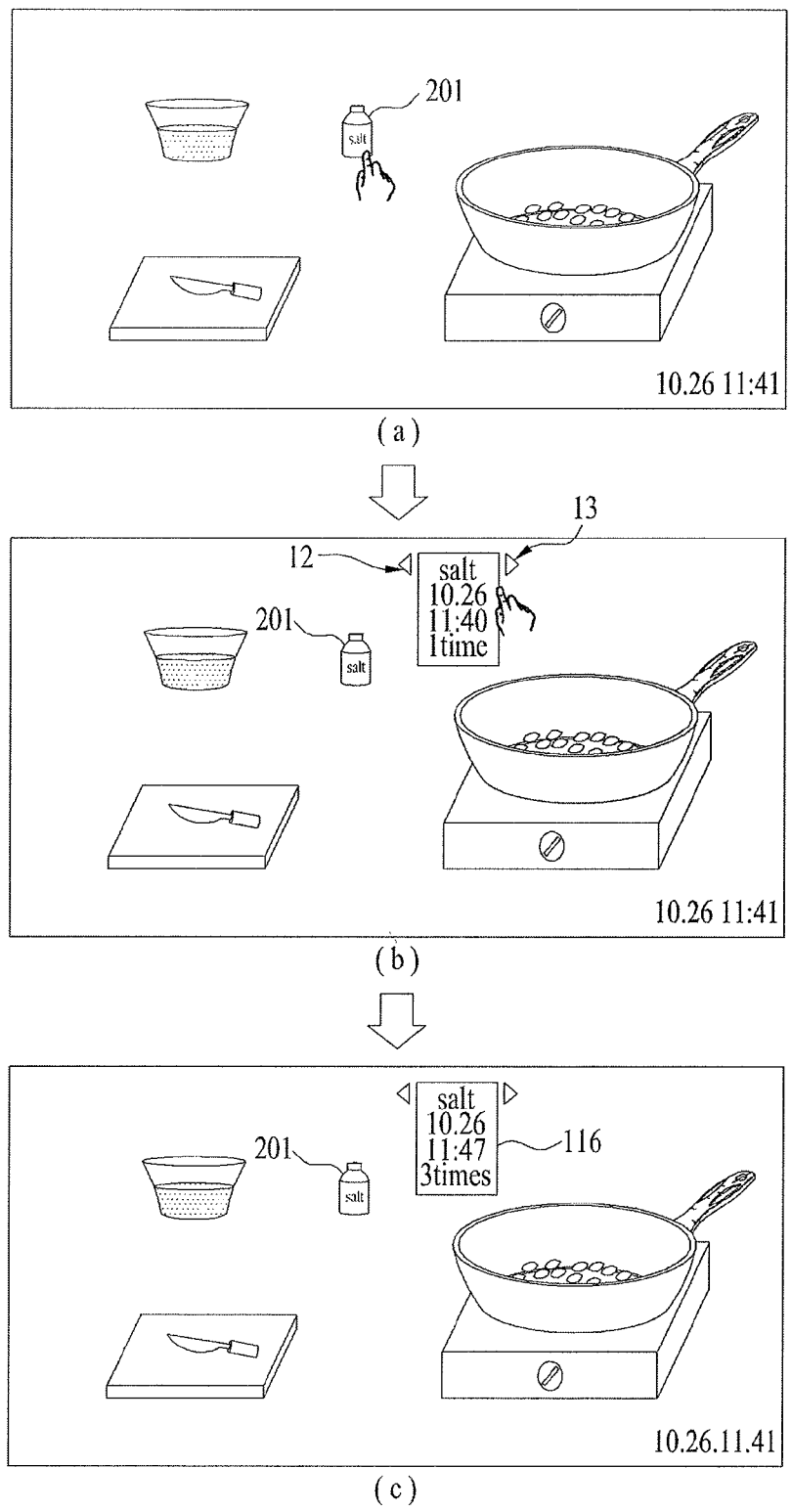
FIG. 7 is a diagram for explaining a first embodiment using history information of an external device.

FIG. 7 is a diagram for explaining a first embodiment using history information of an external device.

Referring to FIG. 7 (a), it shows a terminal device displaying a picture in which an external device is included. FIG. 7 (a) corresponds to a picture in which cooking utensils are captured. Various cooking utensils are included in the picture. The picture can display time information on which the picture is taken. In case of FIG. 7 (a), the picture is captured on October $26^{th}$ 11:41.

Having captured the picture, the terminal device detects an external device in the picture, receives identification information of the external device and the like and may be then able to insert the information into the picture. Hence, if a user selects the external device in the picture, the terminal device can display use information based on the identification information of the selected external device. Or, it may insert the identification information of the external device into the picture only. If the external device in the picture is selected, the terminal device may make a request for information on the selected external device. When the terminal device requests the information on the external device, the terminal device may request whole history information or information of a specific timing. For instance, the terminal device can receive all history information generated by the selected external device. Or, the terminal device transmits time information on which the picture is captured and may be then able to request information corresponding to time on which the time information is transmitted. In this case, the terminal device can make a request for information of a necessary timing whenever the terminal device is necessary to have the information. In an example of FIG. 7 (a), the terminal device can receive an input of a selection command for a seasoning container 201 included in the picture.

Referring to FIG. 7 (b), it shows a screen on which information on a selected external device is displayed.

If a seasoning container 201 is selected, the terminal device can make a request for information on the selected seasoning container 201. As mentioned in the foregoing description, the terminal device may receive information in a manner of directly performing communication with the seasoning container 201 or may make a request for information to a server. The seasoning container 201 or the server can transmit such information as the use history shown in FIG. 6 to the terminal device.

As one embodiment, the terminal device can display the received information based on time on which the picture is captured. Referring to use information of the seasoning container 201 shown in FIG. 6, the seasoning container 201 is used twice on October $26^{th}$ 7 A.M., is used once on October $26^{th}$ 11:40, and is used third times on October $26^{th}$ 11:47. The terminal device can display the use information of the seasoning container 201 based on time on which the picture is captured. The time on which the picture of FIG. 7 is captured is October $26^{th}$ 11:41. Hence, the terminal device can display such information as 'October $26^{th}$ 11:40 used one time' corresponding to the information possessed by the seasoning container 201 on the time on which the picture is captured. And, the terminal device can display ingredient information of a seasoning contained in the seasoning container 201 together with the use information.

The terminal device can display information on the seasoning container 201 on an area in the vicinity of the selected seasoning container 201. Meanwhile, if different information further exits before and after currently displayed information, the terminal device can display a backward/forward selection indicator 12/13. In particular, the terminal device can further display an indicator 12/13 capable of selecting information before and after the currently displayed information. The terminal device can perform a corresponding operation based on a selected indicator 12/13.

Referring to FIG. 7 (c), it shows a terminal device displaying information in response to a selected indicator. If a previous information display indicator 12 is selected, the terminal device can display previous information of the seasoning container 201. In particular, since the currently displayed information corresponds to 'October $26^{th}$ 11:40 used one time', the terminal device may display such information as 'October $26^{th}$ 7 A.M. used twice'. Referring to FIG. 7 (c), a later information display indicator 13 is selected. Hence, the terminal device may display such information 116 as 'October $26^{th}$ 11:47 used third times'. The terminal device can display previous information of currently displayed information in response to selection of the previous information display indicator 12 and can display later information of the currently displayed information in response to selection of the later information display indicator 13.

Figure 8:
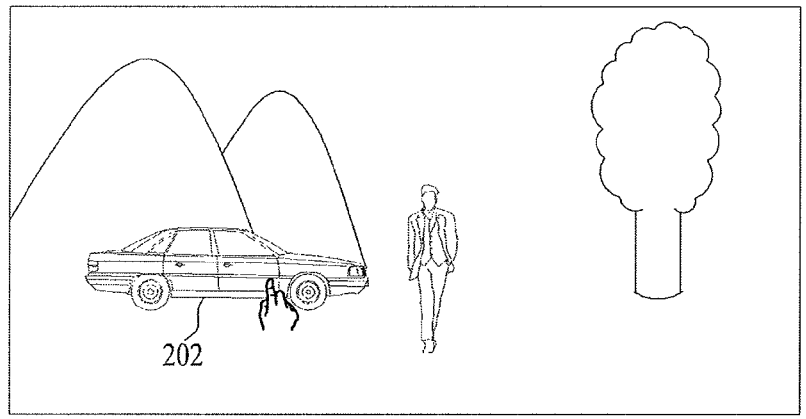
FIG. 8 is a diagram for explaining a second embodiment using history information of an external device.
Figure 8:
Figure 8:
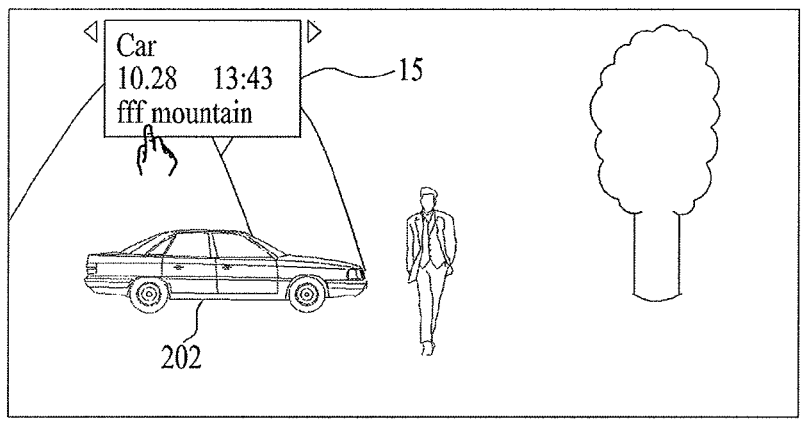
Figure 8:
Figure 8:
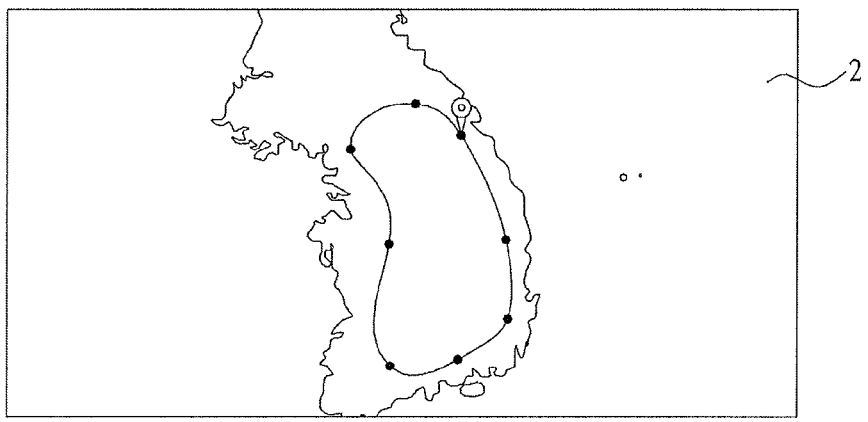

FIG. 8 is a diagram for explaining a second embodiment using history information of an external device.

Referring to FIG. 8 (a), it shows a terminal device displaying a captured picture. The captured picture includes a vehicle 202. The vehicle 202 can also be included in an external device configured to detect information and be connected with a network. The terminal device, which has captured the picture, detects the external device in the picture, receives identification information and the like of the external device and may be able to insert the identification information and the like of the external device into the picture. If the external device in the picture is selected, the terminal device can display use information based on the identification information of the selected external device. Or, the identification information of the external device can be inserted into the picture only. If the external device in the picture is selected, the terminal device may make a request for information of the selected external device. As shown in FIG. 8 (a), the terminal device can receive an input of a selection command for the vehicle 202 included in the picture.

Referring to FIG. 8 (b), it shows a screen on which the information on the selected external device is displayed. If the vehicle 202 is selected, the terminal device may make a request for information on the selected vehicle 202. The terminal device can receive the information on the vehicle by directly performing communication with the vehicle 202 or may make a request for the information to a server.

The terminal device can display the received information based on time on which the picture is captured. For instance, the vehicle 202 can detect time information, location information, path information, speed information, whether information, temperature information and the like. The terminal device can receive the information detected by the vehicle 202 from the server or the vehicle 202. The terminal device can display at least one or more information received from the vehicle 202. As one embodiment, the terminal device can display vehicle detection information 15 including type information indicating a car, date information, time information and location information in the vicinity of an area on which the vehicle 202 is displayed. The vehicle detection information 15 displayed by the terminal device may correspond to information of a timing on which the picture is captured.

The terminal device may further include an indicator capable of selecting previous and later information. As mentioned earlier in FIG. 7, the terminal device can perform a corresponding operation based on a selected indicator. The terminal device can receive an input of a selection command for the displayed vehicle detection information 15.

Referring to FIG. 8 (c), it shows a screen on which whole path information is displayed. The terminal device can receive an input of a selection command for the displayed vehicle detection information 15. Having received the input of the selection command, the terminal device can display the screen 2 on which the whole path information is displayed. The terminal device can display moving path information of the vehicle 202 on a map in a manner of mapping the moving path information to the map. The terminal device can also separately display a location at which the picture is captured. If a user captures a picture while traveling and inputs a selection command for the displayed vehicle detection information 15 to the terminal device, since the vehicle 202 detects information on a partial path only, the terminal device can display information on a path, which is detected until the command is inputted. If the user inputs a selection command for the vehicle detection information 15 to the terminal device after finishing the travel, as shown in FIG. 8 (c), the vehicle 202 can display information on a whole path.

Figure 9:
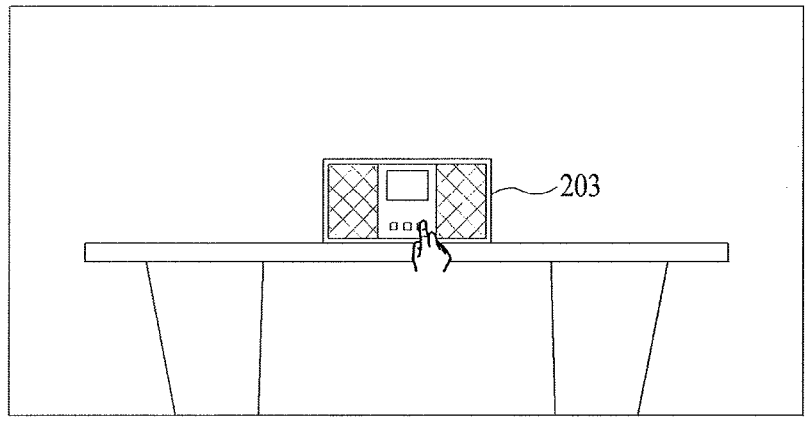
FIG. 9 is a diagram for explaining a third embodiment using history information of an external device.
Figure 9:
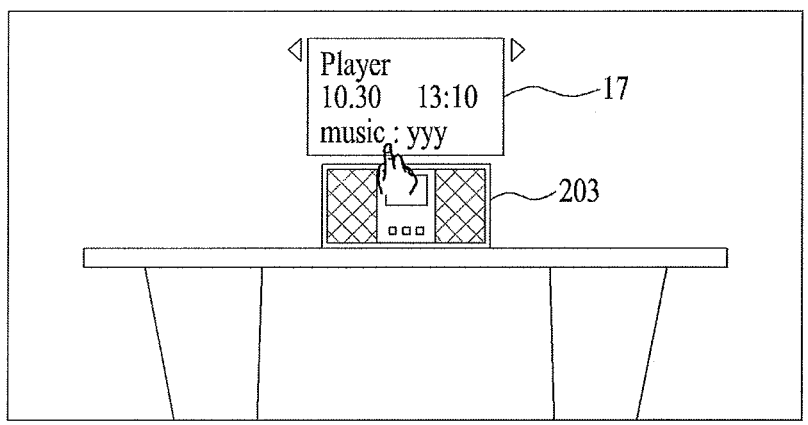
Figure 9:
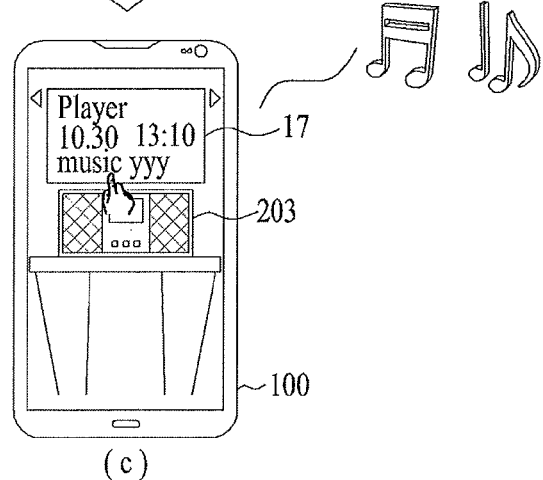

FIG. 9 is a diagram for explaining a third embodiment using history information of an external device.

Referring to FIG. 9 (a), it shows a terminal device displaying a captured picture. The captured picture includes an audio player 203. FIG. 9 (a) shows an audio player 203. The audio player 203 is a kind of content player playing music content. Since a process for the terminal device to detect an external device included in the picture and a process for the terminal device to transmit and receive necessary information are explained in the foregoing description, explanation on the processes is omitted at this time. A user can select the audio player 203 included in the captured picture.

Referring to FIG. 9 (b), it shows a screen on which the information on the selected external device is displayed. If the audio player 203 is selected, the terminal device may make a request for information on the selected audio player 203. The terminal device can receive the information from the audio player 203 or the requested information on the audio player 203 from a server. As one embodiment, the information on the audio player 203 may include type information, listening time information, information on played content, turn-on information, turn-off information and the like. The terminal device can receive history information on the audio player 203. In particular, the terminal device can receive information on the audio player 203 until when the information is requested. The terminal device can display the information 17 on the audio player 203 of a timing on which the picture is captured among the received history information on the audio player 203. The terminal device can further display an indicator capable of selecting previous and later information.

In some cases, when the terminal device makes a request for the information on the audio player 203, the terminal device can make a request for information on a specific timing. For instance, the terminal device transmits information on time on which the picture is captured and may make a request for information corresponding to the transmission time. In particular, the terminal device may make a request for information of a necessary timing whenever the terminal device is necessary to have the information. Or, the terminal device may make a request for the information on the audio player 203 at once. The displayed information on the audio player 203 is capable of being selected.

Referring to FIG. 9 (c), it shows an operation of the terminal device when the information on the audio player is selected.

When the displayed information 17 on the audio player is selected, the terminal device can play displayed content. When the information 17 on the audio player is requested, the terminal device can receive content together with the information on the audio player. The terminal device can play the received content. Or, if the displayed information 17 on the audio player is selected, the terminal device may make a request for content to an external device or a server. The external device or the server can transmit the content to the terminal device. The terminal device stores the received content and may be then able to play the content. Or, the terminal device can play the received content by streaming. And, the server transmitting the content may correspond to a server identical to a server storing the information on the audio player or a separate server.

As mentioned in the foregoing description, when the terminal device receives the information on the audio player, if previous or later information exists, it may further display a selection indicator. The terminal device can display content information, which has been played before or after a displayed content is played, in response to selection of the selection indicator. In particular, the terminal device receives list information of contents used to be played by an external device included in the picture and may be able to display the contents one by one according to a selection of a user. If one content is selected from the content list, the terminal device makes a request for the selected content and may be then able to receive the content. The terminal device can play the received content.

Figure 10:
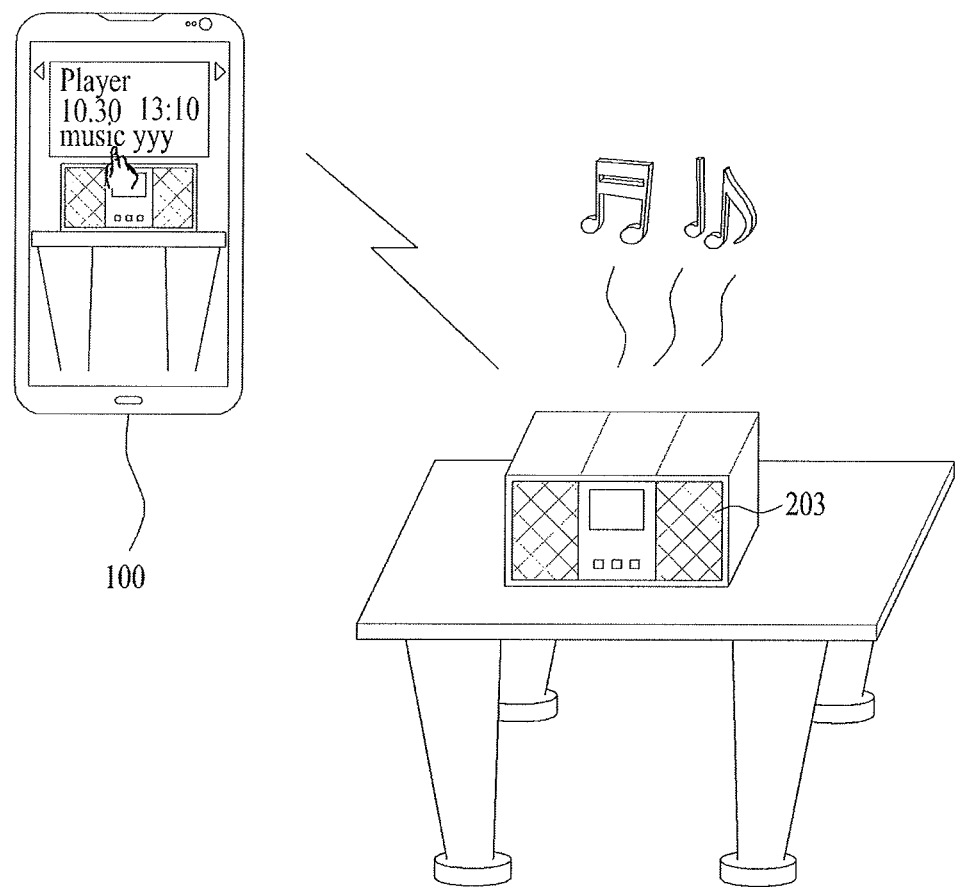
FIG. 10 is a diagram for explaining a fourth embodiment using history information of an external device.

FIG. 10 is a diagram for explaining a fourth embodiment using history information of an external device.

Referring to FIG. 10, it shows a terminal device 100 and an external device 200. The external device 200 may correspond to a content player. As mentioned in the foregoing description, if the external device included in a captured picture is selected, the terminal device 100 receives information on the external device and can display the information. If the displayed information on the external device is selected, the terminal device 100 receives content included in the information on the external device and can play the content.

Meanwhile, the terminal device can control the content included in the information on the external device to be played in the external device 203. As one embodiment, if the displayed information on the external device is selected, the terminal device 100 can display a menu used for selecting a device to play the content. The player selection menu may include the terminal device 100 and the external device 203. In some cases, a different external device can be further included in the player selection menu. Or, if the external device 203 does not exist within a prescribed distance, the terminal device 100 can play the content without displaying the player selection menu. In particular, if the external device 203 exists within the prescribed distance from the terminal device 100, the terminal device 100 can display the player selection menu.

If the external device 203 is selected from the external device selection menu, the terminal device 100 can transmit a content playback command to the external device 203. The external device 203 can play content according to the command of the terminal device. In some cases, when the external device 203 receives the command from the terminal device, the external device may make a request for content to a server. If the external device 203 receives content from the server, the external device can play the received content. Or, the terminal device 100 can transmit the external device 203, content and a playback command to the server. The server transmits the content and the playback command to the external device 203 and the external device may play the received content.

Meanwhile, Examples of the content player may include an audio player, a TV, a PC, a smartphone, a laptop computer, a tablet PC, a game console and the like. Hence, content may include a sound source, a video and a game.

Figure 11:
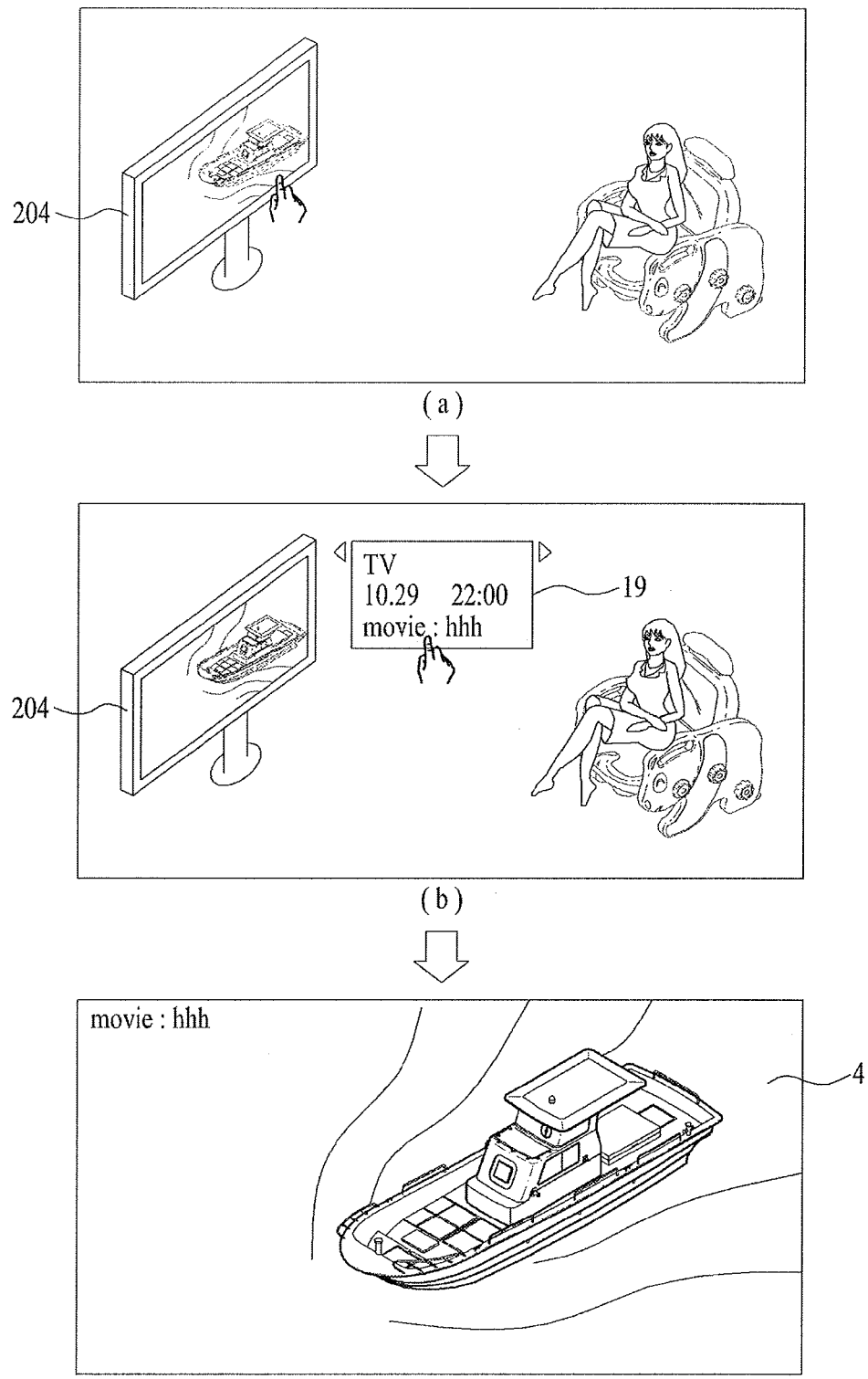
FIG. 11 is a diagram for explaining a fifth embodiment using history information of an external device.

FIG. 11 is a diagram for explaining a fifth embodiment using history information of an external device.

Referring to FIG. 11 (a), it shows a terminal device displaying a picture in which an external device 204 is included. The external device 204 may corresponds to a TV. The TV is a kind of content players playing a video or a broadcast content. The terminal device can detect the external device 204 included in the picture. The terminal device may receive an input of selecting the external device 204 included in the picture.

Referring to FIG. 11 (b), it shows a screen on which information on the selected external device 204 is displayed. If the external device 204 is selected, the terminal device can make a request for information on the selected external device. According to embodiment, the information on the selected external device can be received from the external device 204 or a server. As one embodiment, information on a TV can include a type information, broadcast time information, information on content including a broadcast program, turn-on information, turn-off information, viewing time information and the like. The terminal device can display the received information 19 on the external device. The received information on the external device may correspond to information on a timing on which a picture is captured. The terminal device can display an indicator capable of selecting previous and later information together with the information on the external device. The information 19 on the displayed external device can be selected.

Referring to FIG. 11 (c), it shows an operation of the terminal device in case that the information on the external device is selected.

If the information 19 on the displayed external device is selected, the terminal device can play displayed content 4.

The terminal device can also receive the content when the information 19 on the external device is requested. The terminal device receives the content and may be then able to play the content. Or, if the information 19 on the displayed external device is selected, the terminal device may make a request for content to an external device or a server. The external device or the server can transmit the content to the terminal device. The terminal device receives the content and may be then able to play the content.

In some cases, a size of video content is big or a video content may be relevant to a copyright. Hence, the content included in the information 19 can be provided by a preview service or a summary service instead of the content itself.

Figure 12:
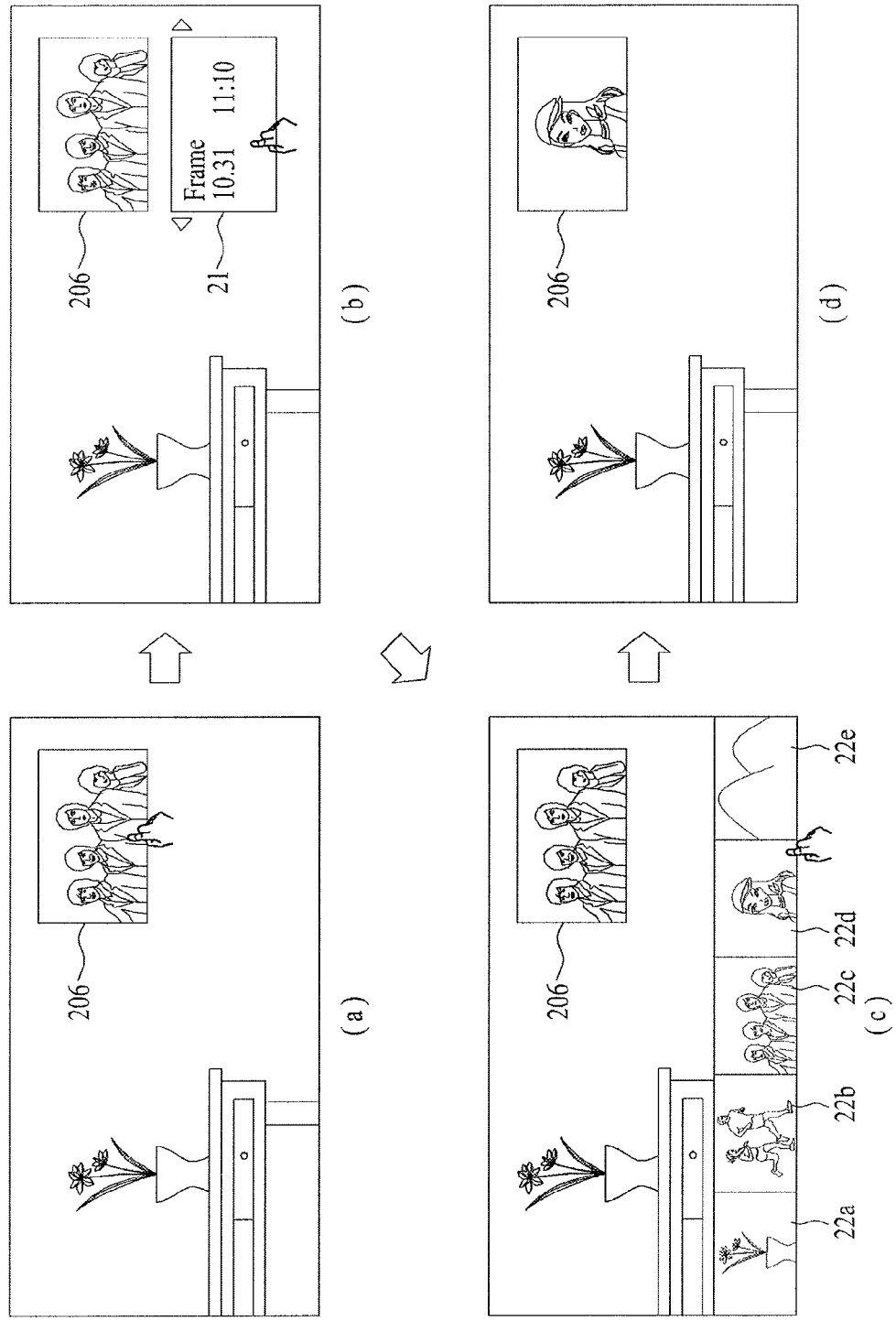
FIG. 12 is a diagram for explaining a sixth embodiment using history information of an external device.

FIG. 12 is a diagram for explaining a sixth embodiment using history information of an external device.

Referring to FIG. 12 (a), it shows a terminal device displaying a picture in which an external device 206 is included. The external device may correspond to an electronic picture frame. The electronic picture frame also corresponds to a kind of content players displaying an image. The external device 206 displays an image used to be displayed on a timing on which the picture is captured. The terminal device can receive an input selecting the external device 206 included in the picture.

Referring to FIG. 12 (b), it shows a screen on which information on the selected external device 206 is displayed. If the external device 206 is selected, the terminal device can make a request for information on the selected external device. As one embodiment, the information on the electronic picture frame can include type information, information on a displayed image, display time information and the like. The terminal device can display the received information 21 on the external device. The received information on the external device may correspond to information of a timing on which the picture is captured. Referring to FIG. 12 (b), an image displayed in the electronic picture frame on the timing on which the picture is captured is included. And, information on the image displayed in the electronic picture frame is included as well. In particular, a picture frame can be displayed as the type information and such information as October 31th 11:10 can be displayed as the display time information. The information on the external device can be selected.

Referring to FIG. 12 (c), it shows an operation of the terminal device when the information on the external device is selected. If the information on the external device is selected, it is able to display an image list including images used to be displayed by the selected external device 206. The image list can be displayed on one area among a top part, a bottom part and a left/right side part of a screen of the terminal device. Referring to FIG. 12 (c), the image list is displayed on the bottom part of the screen of the terminal device. Since the external device 206 has displayed a first image 22a, a second image 22b, a third image 22c, a fourth image 22d and a fifth image 22e, the first image 22a, the second image 22b, the third image 22c, the fourth image 22d and the fifth image 22e can be displayed on the screen of the terminal device. An image displayed by the external device 206 on the timing on which the picture is captured corresponds to the third image 22c. Images used to be displayed by the external device 206 may further exist. If the number of images used to be displayed by the external device 206 is greater than the number of images displayed on the screen of the terminal device, the terminal device arranges the images at the left of the first image 22a or the right of the fifth image 22e and may be able to display the images via scroll. One image can be selected from the image list of the external device 206.

Referring to FIG. 12 (d), it shows an operation of the terminal device when one image is selected. If one image is selected from the image list, the terminal device may make the displayed image list to be disappeared from the screen. The terminal device can display the selected image on a position of the electronic picture frame. In particular, the terminal device can compose the selected image and the picture in which the external device 206 is included. According to FIG. 12 (d), since the fourth image 22d is selected, the image list is disappeared. And, the fourth image 22d can be displayed on the external device 206 area instead of the third image 22c.

Figure 13:
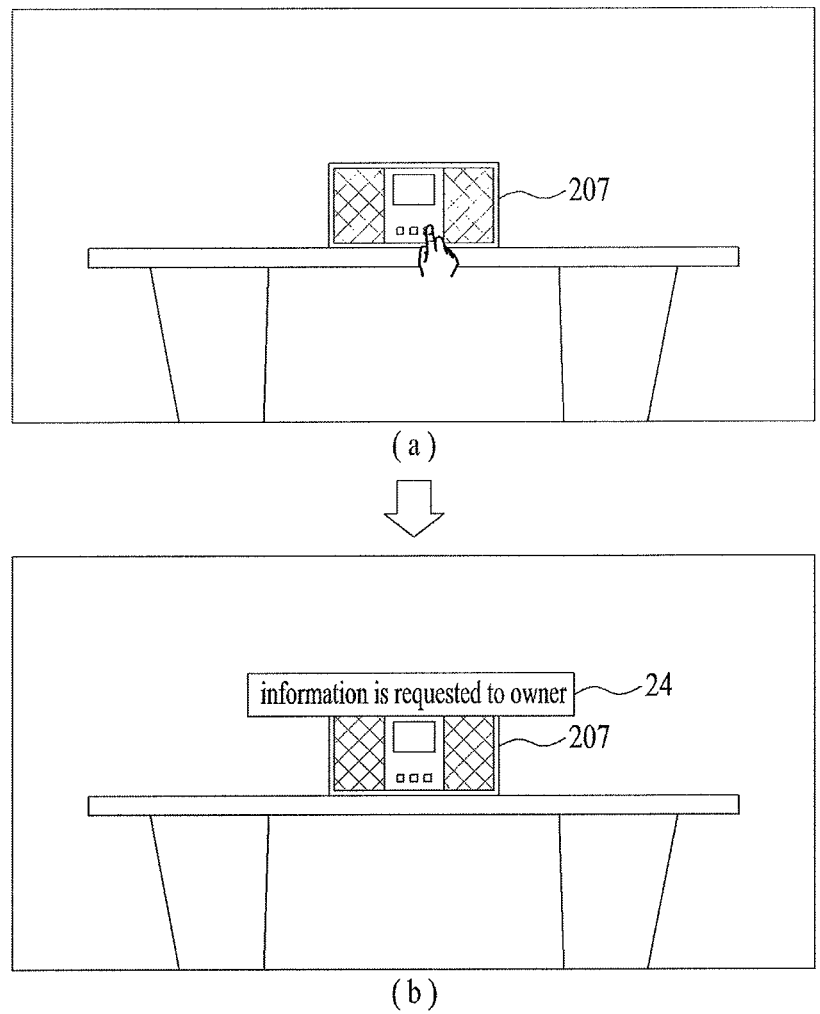
FIG. 13 is a diagram for explaining an embodiment requesting information to an external device owned by a different person.

FIG. 13 is a diagram for explaining an embodiment of requesting information to an external device owned by a different person.

Referring to FIG. 13 (a), it shows a terminal device displaying a picture in which an external device 207 is included. The terminal device can detect the external device 207 included in the picture. And, the terminal device can receive an input of selecting the external device 207 included in the picture. Information received by the terminal device to detect the external device 207 may include authority information or owner information. For instance, the authority information may include a secret, conditional sharing or fully sharing property value. The owner information may include a personal identification value. An owner of the external device 207 included in the picture may correspond to a different person. In this case, the terminal device is unable to receive information on the external device owned by the different person without permission.

Referring to FIG. 13 (b), it explains an operation of the terminal device when a selected external device 207 is owned by a different person. The terminal device can check owner information when the terminal device detects the external device 207 included in the picture. Or, the terminal device can check owner information when the external device 207 included in the picture is selected. In some cases, the terminal device may check information use authority of the external device based on authority information.

If the external device 207 included in the picture is selected and it is checked that an owner of the external device 207 corresponds to a different person, the terminal device can transmit a signal to the owner of the external device to make a request for information. For instance, the signal requesting information can be transmitted to a terminal device owned by the owner for a long time. The terminal device can display a message 24 while waiting for a response from the owner of the external device. For instance, the terminal device can display such a message 24 as 'information is requested to an owner'. If the terminal device receives a response of permission from the owner of the external device, the terminal device receives the information on the external device and may be then able to display the information. If the terminal device receives a response of denial from the owner of the external device, the information requesting operation of the terminal device can be terminated.

According to the aforementioned various embodiments, the terminal device may display the information of the external device and use the information of the external device.

Figure 14:
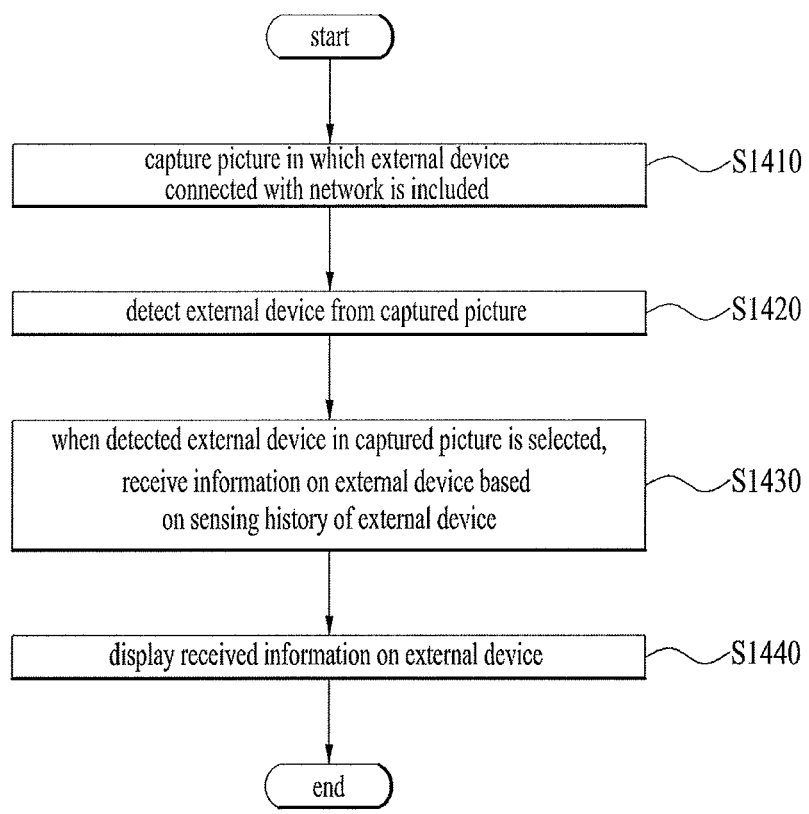
FIG. 14 is a flowchart for a method of controlling a terminal device according to one embodiment.

FIG. 14 is a flowchart for a method of controlling a terminal device according to one embodiment.

According to FIG. 14, a terminal device can capture a picture in which an external device connected with a network is included [S1410]. The terminal device can detect the external device in the captured picture [S1420]. The terminal device extracts exterior information of the external device from the captured picture and may be then able to search for exterior information of a surrounding external device or exterior information of an external device stored in a server matched with the exterior information of the external device. The terminal device can recognize the external device included in the picture based on the exterior information of the matched external device.

The terminal device can receive information on the external device based on a sensing history of the external device when the external device detected in the picture is selected [S1430]. The terminal device can receive the information on the external device. The information on the external device may correspond to information on timing on which the picture is captured. The terminal device can receive history information together with the information on the timing on which the picture is captured. Or, the terminal device may receive the history information on a timing on which the external device included in the picture is selected. In particular, the terminal device can receive information before the timing on which the picture is captured and information after the timing on which the picture is captured.

The terminal device can display the received information on the external device [S1440]. The received information of the external device can be selected. If the received information of the external device is selected, the terminal device can perform such an operation as content playback, whole path display, image list display and the like. Meanwhile, a process of capturing the picture in which the external device is included and a process of receiving and displaying the information on the external device can be performed by terminal devices different from each other.

A terminal device and a method of controlling therefor according to the present specification may not limitedly apply to the composition and method of the aforementioned embodiments. The aforementioned embodiments may be configured in a manner of being selectively combined the whole of the embodiments or a part of the embodiments to achieve various modifications.

Meanwhile, a method of controlling a terminal device according to the present specification can be implemented with a software readable by a processor in a recording media readable by the processor, which is equipped in the display device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. And, to implement in a form of a carrier wave such as a transmission via the internet and the like is also included. And, since the recording media readable by the processor are distributed to the computers connected by a network, codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A terminal device, comprising:
   a camera unit configured to capture a picture, the picture containing an external device that is connected to a network;
   a control unit configured to detect the external device connected to the network from the captured picture;
   a communication unit configured to transmit and receive data; and
   a display unit configured to display the captured picture,
   wherein when the detected external device in the captured picture is selected, the control unit is further configured to control the communication unit to receive information corresponding to the selected external device based on a sensing history of the selected external device and control the display unit to display the received information corresponding to the selected external device on the display unit.

2. The terminal device of claim 1, wherein the control unit is further configured to control the communication unit to receive tagging information from the external device placed within a predetermined distance of the terminal device, and detect the external device based on the received tagging information.

3. The terminal device of claim 2, wherein the tagging information comprises at least one selected from unique information, identification information, location information, authority information and owner information of the external device.

4. The terminal device of claim 1, wherein when the detected external device in the captured picture is selected, the control unit is further configured to control the communication unit to receive the information on the selected external device at a point in time on which the picture is captured.

5. The terminal device of claim 4, wherein the control unit is further configured to control the communication unit to further receive at least one of previous information of the point in time on which the picture is captured and later information of the point in time on which the picture is captured.

6. The terminal device of claim 5, wherein the control unit is further configured to control the display unit to display an indicator selecting the previous information or the later information of the displayed information.

7. The terminal device of claim 1, wherein the information corresponding to the selected external device comprises at least one of use information, moving path information, location information, content information and list information of the selected external device.

8. The terminal device of claim 7, wherein when the selected external device corresponds to a vehicle, the control unit is further configured to control the display unit to display the location information of a point in time on which the picture is captured.

9. The terminal device of claim 8, wherein the control unit is further configured to control the display unit to display the moving path information of the vehicle on a map.

10. The terminal device of claim 7, wherein when the selected external device corresponds to a content player, the control unit is further configured to control the display unit to display the content information of a point in time on which the picture is captured.

11. The terminal device of claim 10, wherein the control unit is further configured to control the communication unit to receive list information of content played by the content player and wherein when one content is selected from the list information of the received contents, the control unit is configured to play the selected content.

12. The terminal device of claim 10, wherein the control unit is further configured to control the communication unit to receive list information of content played by the content player and wherein when one content is selected from the list information of the received contents, the control unit is configured to control the communication unit to transmit a playback command of the selected content to the content player.

13. The terminal device of claim 11, wherein the content comprises at least one of a sound source, a video and a game.

14. The terminal device of claim 7, wherein when the selected external device corresponds to a smart picture frame, the control unit is further configured to control the display unit to display information on an image displayed on the smart picture frame of a point in time on which the picture is captured.

15. The terminal device of claim 14, wherein the control unit is further configured to control the communication unit to receive list information of the image displayed on the smart picture frame and wherein when one image is selected from the received list information of the image, the control unit is configured to control the display unit to display the selected image in a manner of composing with the captured picture.

16. The terminal device of claim 3, wherein the control unit is further configured to determine an owner of the external device based on the owner information of the external device and wherein when the external device is owned by a different person, the control unit is further configured to make a request for data of the external device to the owner of the external device.

17. An information display system, comprising:
a terminal device configured to capture a picture containing an external device that is connected to a network, the terminal device configured to detect the external device connected to the network from the captured picture, the terminal device configured to display the captured picture, the terminal device, when the detected external device in the captured picture is selected, configured to request information corresponding to the selected external device based on a sensing history of the selected external device; and
an external device configured to transmit the information on the selected external device to the terminal device according to the request of the terminal device,
wherein the terminal device is configured to receive and display the information corresponding to the selected external device.

18. A method for controlling a terminal device, comprising: capturing a picture containing an external device that is connected to a network;
detecting the external device connected to the network from the captured picture;
when the detected external device in the captured picture is selected, receiving information corresponding to the selected external device based on a sensing history of the selected external device; and
displaying the received information corresponding to the selected external device.

19. The method of claim 18, wherein the receiving the information corresponding to the selected external device receives the information on the selected external device of a point in time on which the picture is captured.

20. The method of claim 19, wherein the receiving the information corresponding to the selected external device further receives at least one of previous information of the point in time on which the picture is captured and later information of the point in time on which the picture is captured.

* * * * *